United States Patent [19]

Fukuma et al.

[11] 3,950,263

[45] Apr. 13, 1976

[54] GAS COOLING AND FILTERING AGENT FOR AIR BAG GAS GENERATOR

[75] Inventors: Daizo Fukuma, Tokorozawa; Haruki Maruizumi, Tokyo; Tadahiko Nagaoka, Tokorozawa, all of Japan

[73] Assignee: Nissan Motor Co., Ltd., Yokohama, Japan

[22] Filed: Dec. 26, 1973

[21] Appl. No.: 428,125

[30] Foreign Application Priority Data

Dec. 26, 1972 Japan.................................... 48-715
Dec. 26, 1972 Japan.................................... 48-716
Dec. 26, 1972 Japan.................................... 48-718

[52] U.S. Cl. ................... 252/193; 23/281; 55/522; 55/DIG. 16; 55/DIG. 33; 252/188.3 R; 280/150 AB
[51] Int. Cl.² B60R 21/08; B01D 39/00; C09K 3/00
[58] Field of Search............ 252/193, 188.3 R, 387, 252/432, 440, 443; 23/281, 284; 280/150 AB; 55/522, DIG. 16, DIG. 33

[56] References Cited

UNITED STATES PATENTS

| | | | |
|---|---|---|---|
| 3,362,910 | 1/1968 | Ordelt et al............................ | 252/387 |
| 3,618,981 | 11/1971 | Leising et al................. | 280/150 AB |
| 3,715,131 | 2/1973 | Hurley et al.................. | 280/150 AB |
| 3,785,674 | 1/1974 | Poole et al......................... | 280/741 |
| 3,871,684 | 3/1975 | Staudacher et al................ | 280/741 |

*Primary Examiner*—Benjamin R. Padgett
*Assistant Examiner*—Irwin Gluck
*Attorney, Agent, or Firm*—Frank J. Jordan

[57] ABSTRACT

A solid material such as an inorganic carbonate, a salt of a strong inorganic acid and a weak base, or a weak inorganic acid cools gas passing therethrough generated from an azide of an alkali or alkaline earth metal. Toxic, molten particles resulting from decomposition of the azide are trapped and reduced to harmless salts by the solid material.

4 Claims, No Drawings

GAS COOLING AND FILTERING AGENT FOR AIR BAG GAS GENERATOR

This invention relates to an air bag system which is mounted in a vehicle for protecting a vehicle occupant when the vehicle is subjected to a major impact or mechanical shock, and more particularly to a gas cooling and filtering agent for a gas generator of such an air bag system.

A gas generator of an air bag system for a motor vehicle generally employs as a gas generating agent an azide of an alkali metal or an alkaline earth metal such as sodium, potassium, barium or the like, which is decomposed to generate gas for expanding an inflatable confinement of the air bag system when the vehicle receives an impact or mechanical shock of a dangerously large magnitude. Expanding gas generated from such a metal azide contains toxic decomposition products including particles of molten metal and/or metal oxide (e.g., Na and $Na_2O$). In order to remove such toxic components from the expanding gas before it leaves the generator, it has been proposed to build the cylindrical casing of the generator in a double wall construction consisting of a perforated inner cylinder accommodating a gas generating agent and a perforated outer cylinder radially outwardly spaced from the inner cylinder, the inner and outer cylinders being closed at opposite ends and defining therebetween a cylindrical cavity for accommodating a gas cooling and filtering agent. The gas cooling and filtering agent is usually provided in the form of particles in the cylindrical cavity between the perforated inner and outer cylindrical walls, so that expanding gas generated by decomposition of the gas generating agent in the inner cylinder passes through the interstices between the individual particles of the gas cooling and filtering agent before it is released through the perforations in the outer cylinder of the gas generator casing. With such a conventional gas generator, molten particles of toxic metal or metal oxide are trapped by the gas cooling and filtering material and deposited without alteration on the surfaces of the particles thereof. On the other hand, cooling of the expanding gas is usually performed by contact of the gas with the gas cooling and filtering agent during passage therethrough.

The instant invention contemplates to provide a novel gas cooling and filtering agent particularly suitable for use in a gas generator of an air bag system of the nature described above, which is capable of cooling at high efficiency expanding gas resulting from decomposition of an azide of an alkali or alkaline earth metal, and filtering or trapping at high efficiency and reducing to a harmless salt molten particles of the alkali or alkaline earth metal or its oxide which are entrained in the expanding gas. A gas generator incorporating such a gas cooling and filtering agent is desirable not only for its capability of cooling gas at high efficiency, but also for filtering the gas or trapping and reducing toxic molten components of the expanding gas into a harmless salt, as these decomposition products of an alkali or alkaline earth metal or its oxide are very active and adverse to the human body.

It is therefore an object of the present invention to provide a gas cooling and filtering agent particularly suitable for use in a gas generator of an air bag system using an azide of an alkali or alkaline earth metal as a gas generating agent, which is capable of trapping and reducing to a harmless form molten particles of a toxic metal or metal oxide which are entrained in expanding gas while efficiently cooling the gas.

The above and other objects and advantages of the present invention will become apparent from the following description.

The present invention realizes that molten particles of a toxic metal or metal oxide produced by decomposition of an azide of an alkali or alkaline earth metal may be suitably trapped and reduced to a harmless form by a gas cooling and filtering agent disposed in a gas generator composed of an inorganic carbonate, a salt of a strong inorganic acid and a weak base, or a weak inorganic acid.

By employing a gas cooling and filtering agent of an inorganic carbonate, molten particles of an alkali or alkaline earth metal or its oxide in expanding gas may be trapped efficiently and reduced to a relatively thermally stable carbonate. Examples of useful inorganic carbonates include zinc carbonate, calcium carbonate, magnesium carbonate and iron carbonate. More particularly, for example, molten particles of sodium or sodium oxide can be trapped suitably and reduced to sodium carbonate when zinc carbonate or iron carbonate is employed as the gas cooling and filtering agent, as illustrated by the following formulae.

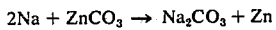

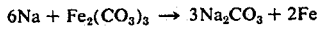

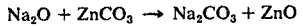

The above-mentioned inorganic carbonate may be employed in the form of powder or granulated particles in the cylindrical cavity of a gas generator casing. In order to ensure high gas cooling and filtering efficiency, the agent should have a large surface area. Alternatively, the gas cooling and filtering agent may be disposed in the gas generator casing as a mixture with particles of a thermally stable metal oxide such as alumina, silica or silica-alumina, or it may be supported by particles of a thermally stable metal oxide or other thermally stable carrier structure such as wire mesh, glass wool, glass filter or the like.

In order to have the inorganic carbonate supported by or deposited on a carrier, a precipitation method may suitably be employed, wherein a carrier structure is immersed at a relatively high temperature in a saturated solution, preferably an aqueous solution, of an inorganic carbonate such as zinc carbonate, calcium carbonate, magnesium carbonate or iron carbonate, and then cooled to allow the carbonate to precipitate on the surface of the carrier structure. If desired, the carbonate may be impregnated into the carrier structure simply by drying with or without heating the carrier after immersing the same in a saturated solution, preferably an aqueous solution, of the carbonate.

Where any of the aforementioned carbonates are used in combination with particles of a thermally stable metal oxide such as alumina, silica, or silica-alumina, the gas cooling efficiency is remarkably improved since the temperature of the expanding gas is reduced upon contact with the carbonate and/or the metal oxide and at the same time by endothermic reaction between the molten particles and the carbonate.

Examples of salts of a strong inorganic acid and a weak base which are useful as a filtering agent in the present invention are anhydrous aluminum sulfate, anhydrous zinc sulfate, anhydrous manganese sulfate and anhydrous iron sulfate. Examples of weak acids useful in the present invention are boric acid and silicic acid. Similar to the carbonates mentioned hereinabove, these salts and weak acids are capable of trapping molten particles of an alkali or alkaline metal or its oxide and reducing them to a harmless salt, as particularly illustrated by the following formulae.

$$6Na + Al_2(SO_4)_3 \rightarrow 3Na_2SO_4 + 2Al$$

$$3Na_2O + Al_2(SO_4)_3 \rightarrow 3Na_2SO_4 + Al_2O_3$$

$$3Na + H_3BO_3 \rightarrow Na_3BO_3 + 3/2H_2$$

Each of the above-mentioned salts and weak acids may be disposed in he form of particles in a cylindrical cavity of a gas generator casing, alone or in combination with particles of a thermally stable metal oxide such as alumina, silica or silica-alumina in a manner similar to the inorganic carbonates mentioned hereinbefore. Likewise, a salt or weak acid may be supported by a suitable carrier including particles of a thermally stable metal oxide as just mentioned, or on a wire mesh, glass wool or a glass filter in a manner the same as the carbonates mentioned above. A wire mesh, glass wool or glass filter may be provided as a retainer on each side of a layer of the gas cooling and filtering agent in contact with inner wall surfaces of the perforated inner and outer cylinders of the gas generator casing.

As with the inorganic carbonates, the salts of a strong inorganic acid and a weak base as well as the weak acids mentioned above can attain a high gas cooling efficiency. The temperature of the expanding gas is reduced by contact with the gas cooling and filtering agent, and also by endothermic reaction between molten particles and the agent. Though use of a strong acid is prohibitively dangerous in view of the great amount of heat which would be produced by reaction with an alkali metal, weak acids such as boric acid and silicic acid can be used quite safely.

Preferred methods of using a gas cooling and filtering agent according to the invention are summarized as follows:

1. An inorganic carbonate, an anhydride of a salt of a strong inorganic acid and a weak base, or a weak acid is provided in the form of particles as a gas cooling and filtering agent in the cylindrical cavity of a gas generator casing;

2. An inorganic carbonate, an anhydride of a salt of a strong inorganic acid and a weak base, or a weak acid is provided in the form of particles as a gas cooling and filtering agent in the cylindrical cavity of a gas generator casing together with particles of a thermally stable metal oxide such as alumina, silica or silica-alumina;

3. An inorganic carbonate, an anhydride of a salt of a strong inorganic acid and a weak base, or a weak acid is deposited on particles of a thermally stable metal oxide such as alumina, silica and silica-alumina and disposed in a cylindrical cavity of a gas generator casing as a gas cooling and filtering agent.

4. An inorganic carbonate, an anhydride of a salt of a strong inorganic acid and a weak base, or a weak acid is provided in the form of powder or particles as a gas cooling and filtering agent in a cylindrical cavity of a gas generator casing, with wire mesh, glass wool or glass filter inserted on each side of the gas cooling and filtering agent for retaining the same in position.

The invention will be particularly illustrated in the following examples.

EXAMPLE 1

$ZnCO_3$ was used as a gas cooling and filtering agent and disposed as particles in a space between perforated inner and outer cylindrical walls of a gas generator casing which contained sodium azide as a gas generating agent, with glass filters inserted one on each side of the agent in contact with the inner wall surfaces of the inner and outer cylinders. After gas generation by decomposition of the gas generating agent, the amount of Na remaining on the glass filters was determined to study the filtering effect. As a result, it was revealed that about 90% to 98% of the theoretical amount of Na contained in the azide was trapped by the agent.

The irregularities in the filtering efficiency are considered to be due to differences in the shape of the filtering agent and in the manner of disposing it in the gas generator casing. Therefore, a higher filtering efficiency may be attained by improving the shape of the agent and the manner of employing the same in the gas generator container.

EXAMPLE 2

Particles of alumina having an average particle size of 400 to 500 microns were immersed in a saturated zinc carbonate solution at 60°C, followed by cooling to normal temperature and drying. The thus obtained gas cooling and filtering agent was disposed in a cavity between perforated inner and outer cylinders of a gas generator casing which contained an azide of an alkali metal as a gas generating agent, with glass wool layers or wire meshes inserted one on each side of the agent in contact with the inner wall surfaces of the inner and outer cylinders. Upon generation of gas by decomposition of the gas generating agent, the cooling and filtering effects of the gas cooling and filtering agent were studied. As a result, it was revealed that expanding gas which had a temperature of 1000°C at the surface of the inner cylinder was cooled down to 150°C before it left the outer cylinder, while molten particles of the alkali metal (or alkali metal oxide) were trapped with a calculated efficiency of 90% to 98%.

EXAMPLE 3

Particles of alumina and aluminum sulfate having a particle size of 500 to 600 microns were mixed together in equivalent amounts and disposed in a cylindrical cavity of a gas generator casing which contained sodium azide as a gas generating agent. As a result of measurements, it was revealed that molten particles of sodium or sodium oxide contained in the expanding gas were trapped with a calculated efficiency of 90% to 98%.

EXAMPLE 4

Particles of alumina and boric acid having a particle size of 500 to 600 microns were mixed together in equivalent amounts and disposed in a cylindrical cavity of a gas generator casing which contained sodium azide as a gas generating agent. As a result of measurement, it was revealed that molten particles of sodium or sodium oxide contained in the expanding gas were trapped with a calculated efficiency of 85% to 90%.

What is claimed is:

1. A gas cooling and filtering agent for use in a gas generator of an air bag system containing an azide of an alkali or an alkaline earth metal as a gas generating agent which generates toxic compounds when decomposed, said gas cooling and filtering agent comprising a material which combines with said toxic compounds to produce harmless compounds, said material being selected from the group consisting of zinc carbonate, calcium carbonate, iron carbonate, aluminum sulfate, zinc sulfate, manganese sulfate, and iron sulfate, and said gas cooling and filtering agent being in the form of particles.

2. A gas cooling and filtering agent according to claim 1, wherein said material is selected from the group consisting of zinc carbonate, calcium carbonate, and iron carbonate.

3. A gas cooling and filtering agent according to claim 1, wherein said material is selected from the group consisting of aluminum sulfate, zinc sulfate, and iron carbonate.

4. A gas cooling and filtering agent according to claim 1, wherein said material is in the form of particles.

* * * * *

UNITED STATES PATENT OFFICE
CERTIFICATE OF CORRECTION

PATENT NO. : 3,950,263
DATED : April 13, 1976
INVENTOR(S) : Daizo FUKUMA, Haruki MARUIZUMI and Tadahiko NAGAOKA It is certified that error appears in the above-identified patent and that said Letters Patent are hereby corrected as shown below:

Claim 3, line 3, after "zinc sulfate", insert --manganese sulfate, line 4, change "iron carbonate" to --iron sulfate--.

Signed and Sealed this

Thirtieth Day of October 1979

[SEAL]

Attest:

RUTH C. MASON
Attesting Officer

LUTRELLE F. PARKER
Acting Commissioner of Patents and Trademarks